US012737090B2

(12) United States Patent
Wang et al.

(10) Patent No.: US 12,737,090 B2
(45) Date of Patent: Sep. 15, 2026

(54) TOUCH PANEL AND TOUCH DEVICE

(71) Applicants: Chengdu BOE Optoelectronics Technology Co., Ltd., Chengdu (CN); BOE Technology Group Co., Ltd., Beijing (CN)

(72) Inventors: Wei Wang, Beijing (CN); Siyu Wang, Beijing (CN); Yi Zhang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/995,941

(22) PCT Filed: Apr. 17, 2024

(86) PCT No.: PCT/CN2024/088176
§ 371 (c)(1),
(2) Date: Jan. 17, 2025

(87) PCT Pub. No.: WO2024/234905
PCT Pub. Date: Nov. 21, 2024

(65) Prior Publication Data
US 2026/0029885 A1 Jan. 29, 2026

(30) Foreign Application Priority Data
May 18, 2023 (CN) ........................ 202310565327.2

(51) Int. Cl.
*G06F 3/044* (2006.01)

(52) U.S. Cl.
CPC .......... *G06F 3/0446* (2019.05); *G06F 3/0443* (2019.05); *G06F 2203/04102* (2013.01); *G06F 2203/04111* (2013.01)

(58) Field of Classification Search
None
See application file for complete search history.

(56) References Cited

U.S. PATENT DOCUMENTS 11,334,179 B2 5/2022 Li et al.
2015/0107978 A1* 4/2015 Han ...................... G06F 3/0443 200/5 R (Continued)

FOREIGN PATENT DOCUMENTS

CN 109213369 B 4/2020
CN 110989863 A * 4/2020 ........... G06F 3/0412

OTHER PUBLICATIONS

Extended European search report of counterpart European application No. 24806262.2 issued on Apr. 28, 2026, 11 pages.

*Primary Examiner* — Duane N Taylor, Jr.
(74) *Attorney, Agent, or Firm* — XSENSUS LLP

(57) ABSTRACT

Provided is a touch panel. The touch panel includes: base substrate, and a touch electrode layer, an insulation layer, and a bridge electrode layer that are arranged on the base substrate in sequence; wherein the touch electrode layer includes a first electrode region, and two second electrode regions on two sides of the first electrode region and spaced apart from the first electrode region, wherein the two second electrode regions are electrically connected to each other through a via in the insulation layer and through the bridge electrode layer; and in at least part of a region of the touch panel, a first orthographic projection of the bridge electrode layer on the base substrate is within a second orthographic projection of the touch electrode layer on the base substrate, wherein an area of the first orthographic projection is less than an area of the second orthographic projection.

19 Claims, 8 Drawing Sheets

(56) References Cited

U.S. PATENT DOCUMENTS

2019/0212847 A1 7/2019 Na et al.
2019/0258338 A1 8/2019 Park

* cited by examiner

TOUCH PANEL AND TOUCH DEVICE

CROSS-REFERENCE TO RELATED APPLICATION

This application is a U.S. national stage of international application No. PCT/CN2024/088176, filed on Apr. 17, 2024, which claims priority to Chinese Patent Application No. 202310565327.2, filed on May 18, 2023 and entitled "TOUCH PANEL AND TOUCH DEVICE," the disclosures of which are herein incorporated by references in their entireties.

TECHNICAL FIELD

The present disclosure relates to the technical field of display, and in particular, relates to a touch panel and a touch device.

BACKGROUND

With development of display technologies, touch panels having a touch folding function are widely used in various display devices (touch devices, for example, a mobile phone having a foldable screen).

SUMMARY

Embodiments of the present disclosure provide a touch panel and a touch device. The technical solutions are as follows.

In some embodiments of the present disclosure, a touch panel is provided. The touch panel includes a base substrate, and a touch electrode layer, an insulation layer, and a bridge electrode layer that are arranged on the base substrate in sequence; wherein

- the touch electrode layer includes a first electrode region, and two second electrode regions on two sides of the first electrode region and spaced apart from the first electrode region, wherein the two second electrode regions are electrically connected to each other through a via in the insulation layer and through the bridge electrode layer; and
- in at least part of a region of the touch panel, a first orthographic projection of the bridge electrode layer on the base substrate is within a second orthographic projection of the touch electrode layer on the base substrate, wherein an area of the first orthographic projection is less than an area of the second orthographic projection.

In some embodiments, the touch panel includes a bendable region having a capability of bending toward a side of the bridge electrode layer away from the insulation layer, wherein the at least part of the region of the touch panel includes at least part of the bendable region.

In some embodiments, in at least part of other regions in the touch panel than the bendable region, a third orthographic projection of the touch electrode layer on the base substrate is within a fourth orthographic projection of the bridge electrode layer on the base substrate.

In some embodiments, the touch electrode layer includes a plurality of first electrode blocks and a plurality of first electrode strips, wherein the plurality of first electrode blocks and the plurality of first electrode strips are both connected in a net structure in the first electrode region and the two second electrode regions; and

- the bridge electrode layer includes at least one second electrode block corresponding to each of the two second electrode regions and at least one second electrode stripe, wherein the at least one second electrode block is connected to the at least one second electrode stripe; and
- for one of the two second electrode regions, at least one second electrode block corresponding to the one of the two second electrode regions is connected to at least one target first electrode block in the first electrode blocks in the one of the two second electrode regions in one-to-one correspondence through the via in the insulation layer.

In some embodiments, the plurality of first electrode blocks include an overlapping first electrode block, wherein an orthographic projection region of the overlapping first electrode block on the base substrate is overlapped with an orthographic projection region of the at least one second electrode stripe on the base substrate, and the overlapping first electrode block is different from the at least one target first electrode block; and

- the at least part of the region of the touch panel includes at least one type of a region of the at least one target first electrode block or a region of the overlapping first electrode block;
- wherein the overlapping first electrode block is different from the at least one target first electrode block, and the orthographic projection region of the overlapping first electrode block on the base substrate is overlapped with the orthographic projection region of the at least one second electrode stripe on the base substrate.

In some embodiments, in a width direction of any of the plurality of first electrode strips connected to the overlapping first electrode block, a size of the overlapping first electrode block is greater than a size of the any of the plurality of first electrode strips.

In some embodiments, an overlapping region between the orthographic projection region of the at least one second electrode stripe on the base substrate and an orthographic projection region of the touch electrode layer on the base substrate is a polygon of which vertex angles all are obtuse angles.

In some embodiments, the touch panel includes a bendable region having a capability of bending in a bending line, wherein an overlapping electrode segment in the at least one second electrode stripe includes a target electrode segment parallel to or perpendicular to the bending line, and an orthographic projection of the overlapping electrode segment on the base substrate is within an orthographic projection of the touch electrode layer on the base substrate.

In some embodiments, the orthographic projection of the overlapping electrode segment on the base substrate is within an orthographic projection of an overlapping first electrode block in the plurality of first electrode blocks on the base substrate,

- a direction of a maximum length of the overlapping first electrode block is parallel to or perpendicular to the bending line, and the target electrode segment is parallel to the direction of the maximum length of the overlapping first electrode block.

In some embodiments, the overlapping electrode segment further includes a first electrode segment and a second electrode segment,

- wherein the first electrode segment, the target electrode segment, and the second electrode segment are connected in sequence, and the first electrode segment is parallel to the second electrode segment and is not parallel to the target electrode segment.

In some embodiments, the touch panel includes a bendable region having a capability of bending in a bending line, wherein the at least one second electrode block in the bridge electrode layer includes a plurality of second electrode blocks arranged in sequence in a direction parallel to or perpendicular to the bending line.

In some embodiments, in the first electrode region and the two second electrode regions, at least part of the first electrode strips in one electrode region close to another electrode region is not connected to the first electrode blocks at an end of the one electrode region facing toward the another electrode region.

In some embodiments, in the first electrode region and the two second electrode regions, at least part of the first electrode blocks in one electrode region close to another electrode region is not connected to the first electrode strips at a side of the one electrode region facing toward the another electrode region.

In some embodiments, two ends of any of the first electrode strips are connected to the first electrode blocks.

In some embodiments, an outer edge of at least one of the first electrode region or the second electrode region is a polygon of which vertex angles all are obtuse angles.

In some embodiments, in the at least part of the region of the touch panel, a minimum edge distance between the first orthographic projection and the second orthographic projection is greater than 1 micron and less than 2 microns.

In some embodiments of the present disclosure, a touch panel is provided. The touch panel includes: a base substrate, and a touch electrode layer, an insulation layer, and a bridge electrode layer that are arranged on the base substrate in sequence; wherein the touch electrode layer includes a first electrode region, and two second electrode regions on two sides of the first electrode region and spaced apart from the first electrode region, wherein the two second electrode regions are electrically connected to each other through a via in the insulation layer and through the bridge electrode layer;

- the touch electrode layer includes a plurality of first electrode blocks and a plurality of first electrode strips, wherein the plurality of first electrode blocks and the plurality of first electrode strips are both connected in a net structure in the first electrode region and the two second electrode regions;
- the bridge electrode layer includes second electrode blocks corresponding to the two second electrode regions respectively and at least one second electrode stripe, wherein the second electrode blocks are connected to the at least one second electrode stripe; and
- for one of the two second electrode regions, at least one of the second electrode blocks corresponding to the one of the two second electrode regions is connected to at least one of the first electrode blocks in the one of the two second electrode regions in one-to-one correspondence through the via in the insulation layer; and
- the touch panel includes a bendable region having a capability of bending in a bending line, wherein an overlapping electrode segment in the at least one second electrode stripe includes a target electrode segment parallel to or perpendicular to the bending line, and an orthographic projection of the overlapping electrode segment on the base substrate is within an orthographic projection of the touch electrode layer on the base substrate.

In some embodiments, the orthographic projection of the overlapping electrode segment on the base substrate is within an orthographic projection of an overlapping first electrode block in the plurality of first electrode blocks on the base substrate,

- a direction of a maximum length of the overlapping first electrode block is parallel to or perpendicular to the bending line, and the target electrode segment is parallel to the direction of the maximum length of the overlapping first electrode block.

In some embodiments of the present disclosure, a touch panel is provided. The touch panel includes: a base substrate, and a touch electrode layer, an insulation layer, and a bridge electrode layer that are arranged on the base substrate in sequence; wherein the touch electrode layer includes a first electrode region, and two second electrode regions on two sides of the first electrode region and spaced apart from the first electrode region, wherein the two second electrode regions are electrically connected to each other through a via in the insulation layer and through the bridge electrode layer;

- the touch electrode layer includes a plurality of first electrode blocks and a plurality of first electrode strips, wherein the plurality of first electrode blocks and the plurality of first electrode strips are both connected in a net structure in the first electrode region and the two second electrode regions; and in the first electrode region and the two second electrode regions, at least part of the first electrode strips in one electrode region close to another electrode region is not connected to the first electrode blocks at a side of the one electrode region facing toward the another electrode region; and
- the bridge electrode layer includes second electrode blocks corresponding to the two second electrode regions respectively and at least one second electrode stripe, wherein the second electrode blocks are connected to the at least one second electrode stripe; and
- for one of the two second electrode regions, at least one of the second electrode blocks corresponding to the one of the two second electrode regions is connected to at least one of the first electrode blocks in the one of the two second electrode regions in one-to-one correspondence through the via in the insulation layer.

In some embodiments of the present disclosure, a touch device is provided. The touch device includes the touch panel according to any above embodiment, and a touch chip, wherein the touch chip is configured to determine a touch position on the touch panel through a touch electrode layer in the touch panel.

In some embodiments, the touch device has a bendable region.

BRIEF DESCRIPTION OF DRAWINGS

For clearer description of the technical solutions according to the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objects, technical solutions, and advantages of the present disclosure, the embodiments of the present disclosure are described in detail hereinafter in combination with the accompanying drawings.

The touch panel includes a touch electrode layer, an insulation layer, and a bridge electrode layer that are arranged in sequence. The touch electrode layer includes a first electrode region, and two second electrode regions on two sides of the first electrode region and spaced apart from the first electrode region. The two second electrode regions are electrically connected to each other through a via in the insulation layer and through the bridge electrode layer. The first electrode region is crossed with the two electrically connected second electrode regions to form a mutual capacitive touch panel.

Figure 1:
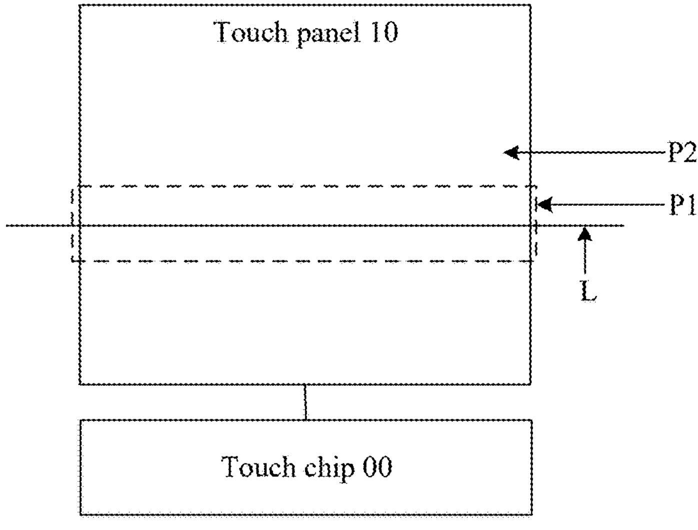
FIG. 1 is a schematic structural diagram of a touch device according to some embodiments of the present disclosure.

FIG. 1 is a schematic structural diagram of a touch device according to some embodiments of the present disclosure. Referring to FIG. 1, the touch device includes a touch panel 10 and a touch chip 00. The touch chip 00 is configured to determine a touch position on the touch panel 10 through a touch electrode layer (not shown in FIG. 1) in the touch panel 10.

In the case that a target object (for example, a finger of a user) touches the touch panel 10, the touch chip 00 detects that a sensing signal of a touch electrode structure at the position of the target object changes, and determines a position where the sensing signal changes as a touch position.

In some embodiments, the touch device has a display function or does not have a display function, which is not limited in the present disclosure. In the case that the touch device has a display function, the touch device is any product or assembly with the touch display function, for example, a mobile phone, a tablet, a TV, a navigator, or the like. In addition, in the case that the touch device has a display function, a part in the touch device for displaying images is the touch panel 10 (in this case, the touch panel 10 is also referred to as a touch display panel) or a pat dependent from the touch panel 10, and the pat and the touch panel 10 are stacked.

In some embodiments, referring to FIG. 1, the touch panel 10 includes a bendable region P1. The bendable region P1 is located in a bendable region of the touch device. The touch device is also referred to as a foldable touch device, at least part of a structure of the bendable region P1 of the touch panel 10 is a flexible structure capable of achieving bending of the bendable region P1.

For example, referring to FIG. 1, bendable region P1 of the touch panel 10 is bendable along a bending line L. Alternatively, the touch panel 10 is bendable in other direction, which is not limited in the embodiments of the present disclosure.

Figure 2:
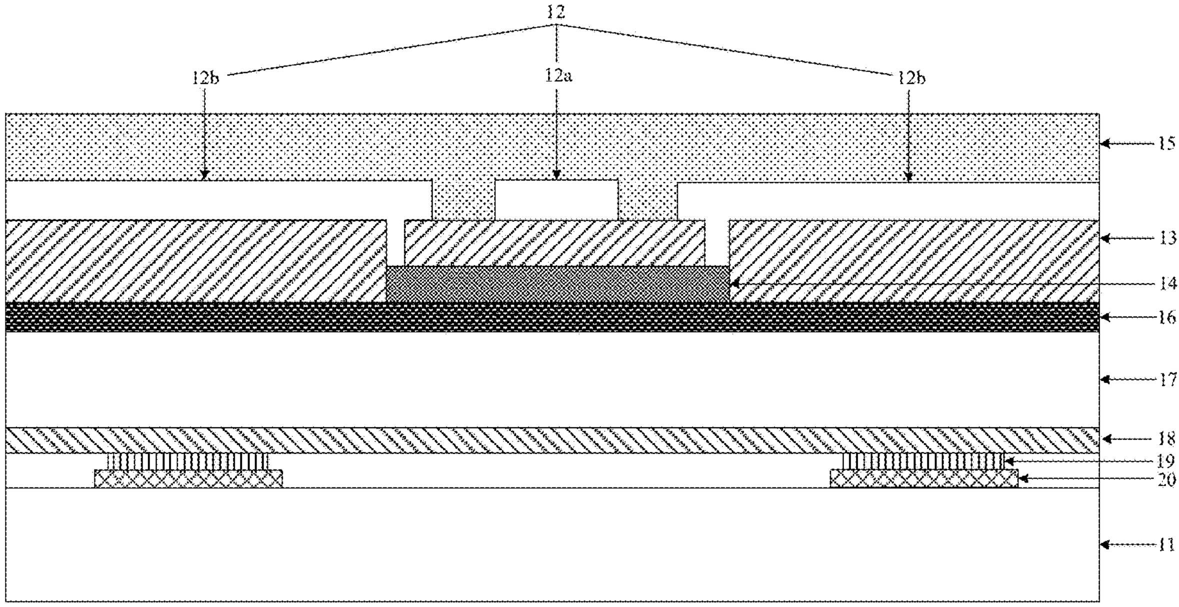
FIG. 2 is a schematic structural diagram of a touch panel according to some embodiments of the present disclosure.

FIG. 2 is a schematic structural diagram of a touch panel according to some embodiments of the present disclosure. The touch panel is applicable to the touch device shown in FIG. 1. Referring to FIG. 2, the touch panel 10 includes a base substrate 11, and a touch electrode layer 12, an insulation layer 13, and a bridge electrode layer 14 that are arranged on the base substrate 11 in sequence.

Referring to FIG. 2, the touch electrode layer 12 includes a first electrode region 12*a*, and two second electrode regions 12*b* on two sides of the first electrode region 12*a* and spaced apart from the first electrode region 12*a*. The two second electrode regions 12*b* are electrically connected to each other through a via in the insulation layer 13 and through the bridge electrode layer 14. One of the first electrode region 12*a* and the second electrode region 12*b* is a drive electrode (Tx) region, and another of the first electrode region 12*a* and the second electrode region 12*b* is a detection electrode (Rx) region.

Figure 3:
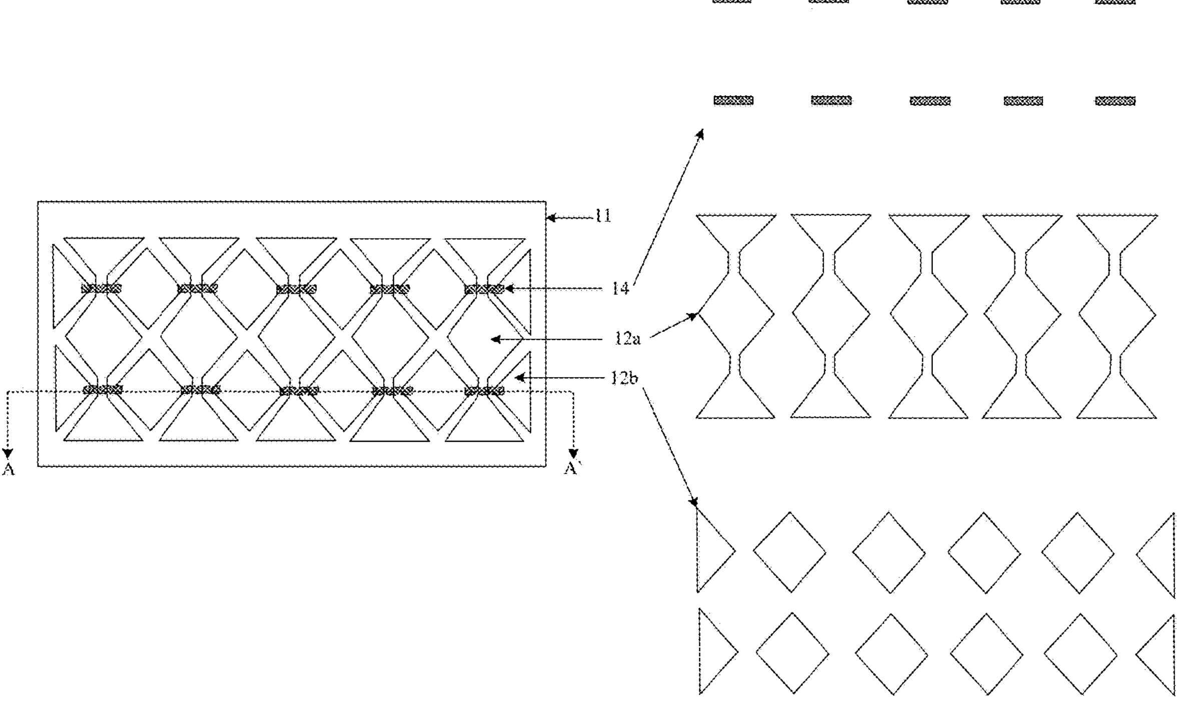
FIG. 3 is a schematic structural diagram of a touch panel according to some embodiments of the present disclosure.

The touch electrode layer 12 includes one or more first electrode regions 12*a*, and FIG. 2 only shows one first electrode region 12*a*. FIG. 3 is a top view of a touch electrode layer 12 according to some embodiments of the present disclosure. FIG. 2 is section diagram of the top view shown in FIG. 3 at an AA' direction. It should be noted that FIG. 3 does not show he structure of the insulation layer 13.

Referring to FIG. 3, the touch electrode layer 12 includes a plurality of first electrode regions 12*a* and a plurality of second electrode regions 12*b*. Shapes of the plurality of first electrode regions 12*a* and the plurality of second electrode regions 12*b* shown in FIG. 3 are an alternative example according to the present disclosure, and the plurality of first electrode regions 12*a* and the plurality of second electrode regions 12*b* may be in other shapes, which are not limited in the present disclosure.

In the touch panel in some practices, a second orthographic projection of the touch electrode layer 12 on the base substrate 11 is within a first orthographic projection of the bridge electrode layer 14 on the base substrate 11. In the touch panel 10 according to the present disclosure, in at least part of a region of the touch panel 10, a first orthographic projection of the bridge electrode layer 14 on the base substrate 11 is within a second orthographic projection of the touch electrode layer 12 on the base substrate 11. An area of the first orthographic projection is less than an area of the second orthographic projection. The at least part of the region of the touch panel 10 is set based on performance requirements of the touch device. For example, the at least part of the region includes at least part of the bendable region P1 of the touch panel 10. The bendable region P1 is bent towards a side of the bridge electrode layer 14 away from the insulation layer 13 and/or towards a side of the bridge electrode layer 14 close to the insulation layer 13. Based on the design, the structure of the touch panel 10 is diversified, such that the performance of the touch panel 10 is greater in performing some operations (for example, a bending operation).

In summary, the touch panel according to the embodiments of the present disclosure includes a base substrate, and a touch electrode layer, an insulation layer, and a bridge electrode layer that are arranged on the base substrate in sequence. The touch electrode layer includes a first electrode region, and two second electrode regions on two sides of the first electrode region and spaced apart from the first electrode region, wherein the two second electrode regions are electrically connected to each other through a via in the insulation layer and through the bridge electrode layer. An orthographic projection of the bridge electrode layer on the base substrate is within an orthographic projection of the touch electrode layer on the base substrate. An area of the first orthographic projection is less than an area of the second orthographic projection. As the relation of the projections of the touch electrode layer and the bridge electrode layer on the base substrate in the touch panel according to the embodiments of the present disclosure is different from the relation of the projections of the touch electrode layer and the bridge electrode layer on the base substrate in some practices, the implementations of the structure of the touch panel is diversified.

In some embodiments, as shown in FIG. 2, the touch electrode layer 12, the insulation layer 13, and the bridge electrode layer 14 in the touch panel 10 are arranged in a direction close to the base substrate 11 in sequence. Alternatively, the touch electrode layer 12, the insulation layer 13, and the bridge electrode layer 14 are arranged in a direction away from the base substrate 11 in sequence, which is not limited in the embodiments of the present disclosure.

In some embodiments, the touch electrode layer 12 and the bridge electrode layer 14 are metal layers. In some embodiments, the touch electrode layer 12 and the bridge electrode layer 14 are not metal layers. For example, at least one of the touch electrode layer 12 and the bridge electrode layer 14 is made of non-metal (for example, indium tin oxide), which is not limited in the embodiments of the present disclosure.

Referring to FIG. 2, the touch panel 10 further includes a protection layer 15 on a side of the touch electrode layer 12 away from the base substrate 11, and a barrier layer (also referred to as the insulation layer) 16, an encapsulation layer 17, a cathode layer 18, a light-emitting layer 19, and an anode layer 20 that are disposed on a side of the bridge electrode layer 14 close to the base substrate 11 and arranged in the direction close to the base substrate 11 in sequence.

It can be understood that each film layer in the touch panel 10 is of a single-layer structure or a multi-layer structure, and the embodiments of the present disclosure are illustrated using an example where each film layer is of a single-layer structure.

In the embodiments of the present disclosure, the touch panel 10 shown in FIG. 2 is manufactured by different methods. In a first alternative implementation, the anode layer 20, the light-emitting layer 19, the cathode layer 18, the encapsulation layer 17, the barrier layer 16, the bridge electrode layer 14, the insulation layer 13, the touch electrode layer 12, and the protection layer 15 are formed on a side of the base substrate 10 in sequence to acquire the touch panel 10. In the implementation, after the insulation layer 13 is formed on the bridge electrode layer 14, the insulation layer 13 is patterned to form a via. Then, the touch electrode layer 12 is formed on the insulation layer 13 including the via. Referring to FIG. 2, a material filled in the via in the insulation layer 13 is the same as a material of the touch electrode layer 12.

In a second alternative implementation, after a display portion (that is, a structure including the base substrate, the anode layer 20, the light-emitting layer 19, the cathode layer 18, and the encapsulation layer 17) and a touch portion (that is, a structure including the barrier layer 16, the touch electrode layer 14, the insulation layer 13, the touch electrode layer 12, and the protection layer 15) in the touch panel 10 are manufactured, the display portion and the touch portion is assembled to acquire the touch panel 10. In the process of manufacturing the touch portion, the touch electrode layer 12, the insulation layer 13, the bridge electrode layer 14, and the barrier layer 16 are formed on a side of the protection layer 15 in sequence, such that the touch portion of the touch panel 10 is formed. In the implementation, a material filled in the via in the insulation layer 13 is the same as a material of the bridge electrode layer 14.

It can be understood that in addition to above two implementations, the touch panel 10 may be formed by other manufacturing methods, which is not limited in the embodiments of the present disclosure.

In some embodiments, in the case that the touch panel 10 includes a bendable region P1 having a capability of bending towards a side of the bridge electrode layer 14 away from the insulation layer 13, the at least part of the region of the touch panel 10 includes at least part of the bendable region P1.

It can be understood that in the case that the bendable region P1 in the touch panel 10 is bent, various film layers in the touch panel 10 are deformed due to the bending, and thus generate a stress to resist the deformation. In the case that the stress in a region of the film layer is large (that is, the stress is concentrated), the region may appear crack. In the bending process of the touch panel 10, as the insulation layer 13 is subjected to the interaction force between the touch electrode layer 12 and the bridge electrode layer 14, the stress is concentrated, and the insulation layer 13 is prone to crack relative to other film layers. In the case that the insulation layer 13 appears crack, the moisture-oxygen isolation performance of the insulation layer 13 to the bridge electrode layer 14 is reduced. In the case that the moisture and oxygen reaches the bridge electrode layer 14 after running through the insulation layer 13, the bridge electrode layer 14 is corroded and the performance is dropped, and even the touch panel 10 cannot work normally.

In the touch panel 10 according to the embodiments of the present disclosure, in at least part of the bendable region P1 in the touch panel 10, the first orthographic projection of the bridge electrode layer 14 on the base substrate 11 is within the second orthographic projection of the touch electrode layer 12 on the base substrate 11, and the area of the first orthographic projection is less than the area of the second orthographic projection, such that the touch electrode layer 12 in the at least part of the bendable region P1 wraps the insulation layer 13 in the case that the bendable region P1 in the touch panel 10 bends towards a direction in a side of the bridge electrode layer 14 away from the insulation layer 13. As such, the touch electrode layer 12 in the at least part of the bendable region supports the insulation layer 13 in the bending process. On this basis, the stress generated in the insulation layer 13 in the bending process is effectively alleviated to avoid the fracture of the insulation layer 13 due to excessive stress concentration, and thus the great bending performance of the touch panel 10 is ensured.

In the embodiments of the present disclosure, for other regions P2 in the touch panel 10 than the bendable region P1, the insulation layer 13 in the other regions P2 does not appear crack due to the bending operation because stress in various film layers in the other regions is not concentrated in the bending process. On this basis, in at least part of the other regions P2, a third orthographic projection of the touch electrode layer 12 on the base substrate 11 is within a fourth orthographic projection of the bridge electrode layer 14 on the base substrate 11. In this case, an area of the third orthographic projection is less than or equal to an area of the fourth orthographic projection. The at least part of the region includes at least one of a region where the second electrode region 12*b* of the touch electrode layer 12 is electrically connected to the bridge electrode layer 14 through the via in the insulation layer 13 or a region of the overlapping region (for example, a second region described hereinafter) between the touch electrode layer 12 and the bridge electrode layer 14.

It can be understood that in some embodiments, the fourth orthographic projection is within the third orthographic projection, and an area of the fourth orthographic projection is less than an area of the third orthographic projection, which is not limited in the embodiments of the present disclosure.

Figures 4, 5:
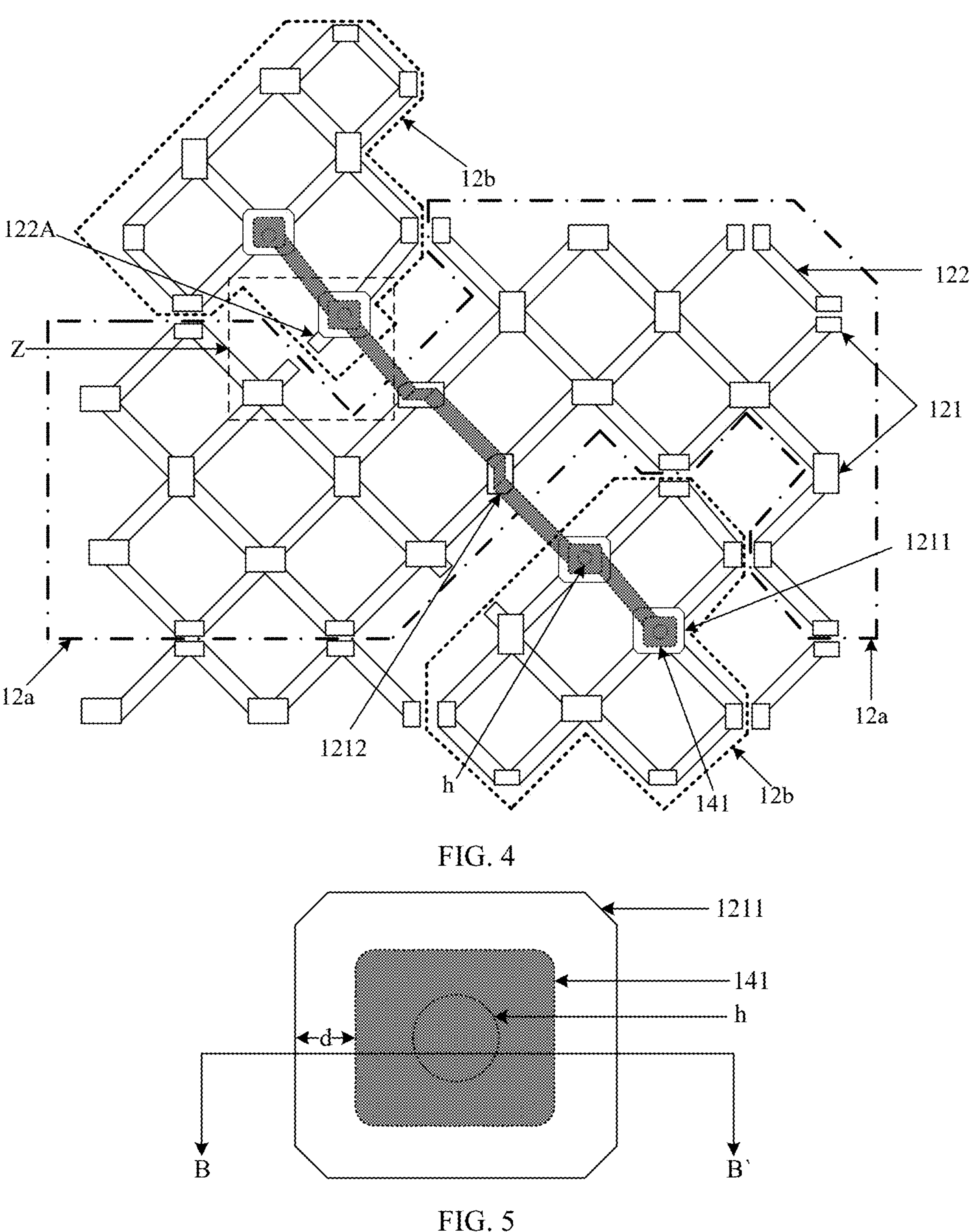
FIG. 4 is a schematic structural diagram of a touch electrode layer according to some embodiments of the present disclosure.
FIG. 5 is a schematic section diagram of a first region in a touch panel according to some embodiments of the present disclosure.

FIG. 4 is schematic structural diagram of a touch panel according to some embodiments of the present disclosure. Referring to FIG. 4, the touch electrode layer 12 includes a plurality of first electrode blocks 121 and a plurality of first electrode strips 122. The plurality of first electrode blocks 121 and the plurality of first electrode strips 122 are both connected in a net structure in the first electrode region 12*a* and the two second electrode regions 12*b*. In addition, in the net structure, adjacent first electrode strips 122 are connected through the first electrode block 121. In addition, the first electrode blocks 121 and the first electrode strips 122 are disposed in the same layer and are connected to a one-piece part. In this case, no actual boundary is present between the first electrode block 121 and the first electrode stripe 122.

The bridge electrode layer 14 includes at least one second electrode block 141 (the two second electrode regions 12*b* correspond to different second electrode blocks 141) corresponding to each of the two second electrode regions 12*b* and at least one second electrode stripe. FIG. 4 is illustrated using an example where each second electrode region 12*b* corresponds to two second electrode blocks 141, and the present disclosure does not limit a number of second electrode blocks 141 corresponding to the second electrode region 12*b*. The at least one second electrode block 141 is connected to the at least one second electrode stripe 142. For one second electrode region 12*b*, at least one second electrode block 141 corresponding to the second electrode region 12*b* is connected to at least one target first electrode block 1211 in the first electrode blocks 121 in the second electrode region 12*b* in one-to-one correspondence through the via h in the insulation layer 13.

In some embodiments, the at least one target first electrode block 1211 is a first electrode block 121 in the second electrode region 12*b* closer to another second electrode region 12*b*. Alternatively, the at least one target first electrode block 1211 is a first electrode block 121 in the second electrode region 12*b* randomly selected from the second electrode region 12*b*, which is not limited in the embodiments of the present disclosure.

In the case that the touch device including the touch panel 10 has the display function, the first electrode region 12*a* and the two second electrode regions 12*b* are both designed as the net structure to ensure the touch operation of the touch device and the display effect of the touch device. The net structure is correlated with arrangement of light-emitting pixels in the touch panel 10. For example, each net cell in the net structure surrounds a light-emitting region of at least one light-emitting pixel. Illustratively, referring to FIG. 4, a shape of the net cell in the net structure is a quadrangle.

In the embodiments of the present disclosure, for electrical connection between two adjacent second electrode regions 12*b*, the via h is defined in a region of the insulation layer 13 covered by the target first electrode block 1211, and the second electrode block 141 corresponding to the second electrode region 12*b* is disposed at the via h, such that the second electrode block 141 is connected to the corresponding target first electrode block 1211. In the case that the second electrode blocks 141 corresponding to two adjacent second electrode regions 12*b* are connected to each other through the second electrode stripe 142, the two adjacent second electrode regions 12*b* are electrically connected to each other through the second electrode block 141 and the second electrode stripe 142.

In the embodiments of the present disclosure, for insulation between the first electrode region 12*a* and the second electrode region 12*b* in the touch electrode layer 12, after acquisition of the net structure composed of the blocks and strips, the net structure is segmented to acquire the first electrode regions 12*a* and the second electrode regions 12*b*. The segmentation position is the position of the block or stripe in the net structure. In the case that the segmentation position is the position of the block in the net structure, the block is divided into two first electrode blocks 121, and the unsegmented block in the net structure is also the first electrode block 121. In the case that the segmentation position is the position of the stripe in the net structure, the stripe is divided into two first electrode strips 122, and the unsegmented stripe in the net structure is also the first electrode stripe 122.

The following describes several implementations of the touch panel 10 for alleviating the stress concentration of the insulation layer 13. It can be understood that the implementations can be combination arbitrarily, and the touch panel 10 alleviates the stress concentration of the insulation layer 13 by at least one of the following methods.

(1) The plurality of first electrode blocks 121 include an overlapping first electrode block 1212. An orthographic projection region of the overlapping first electrode block 1212 on the base substrate 11 is overlapped with an orthographic projection region of the at least one second electrode stripe 142 on the base substrate 11, and the overlapping first electrode block 1212 is different from the at least one target first electrode block 1211. Based on above embodiments, the at least part of the region of the touch panel 10 includes at least one a region (a first region for short hereinafter) of the at least one target first electrode block 1211 or a region of the overlapping first electrode block 1212 (a second region for short hereinafter).

It can be understood that on the premise that the at least part of the region of the touch panel 10 includes at least part of the bendable region P1 in the touch panel 10, the at least part of the bendable region P1 refers to at least one of the first region or the second region.

It can be understood that for any of the first region and the second region in the touch panel 10, the electrode layers (that is, the touch electrode layer 12 and the bridge electrode layer 14) are disposed on two sides of the insulation layer 13, and the electrode layer is only disposed on one side of the insulation layer 13 in other regions than the first region and the second region. Based on the force analysis of the insulation layer 13 in the above embodiments, the stress concentration in the insulation layer 13 in the first region and the second region is greater than that in other regions except the two regions.

In the embodiments of the present disclosure, in the case that the at least part of the region of the touch panel 10 includes the first region, the first orthographic projection of the bridge electrode layer 14 on the base substrate 11 refers to an orthographic projection of each second electrode stripe 142 in the bridge electrode layer 14 on the base substrate 11, and the second orthographic projection of the touch electrode layer 12 on the base substrate 11 refers to an orthographic projection of each target first electrode block 1211 in the touch electrode layer 12 on the base substrate 11.

In the case that the at least part of the region of the touch panel 10 includes the first region, and the touch panel 10 performs the bending operation, the target first electrode block 1211 in the first region wraps the insulation layer 13 in the region, such that the stress concentration in the insulation layer 13 in the first region is alleviated.

In the case that the at least part of the region of the touch panel 10 includes the second region, the first orthographic projection of the bridge electrode layer 14 on the base substrate 11 refers to an orthographic projection region, overlapped with the orthographic projection region of the overlapping first electrode block 1212 on the base substrate 11, in an orthographic projection of at least one second electrode stripe 142 in the bridge electrode layer 14 on the base substrate 11, and the second orthographic projection of the touch electrode layer 12 on the base substrate 11 refers to orthographic projections of the overlapping first electrode block 1212 in the touch electrode layer 12 on the base substrate 11.

In the case that the at least part of the region of the touch panel 10 includes the second region, and the touch panel 10 performs the bending operation, the overlapping first electrode block 1212 in the second region wraps the insulation layer 13 in the region, such that the stress concentration in the insulation layer 13 in the second region is alleviated.

In the embodiments of the present disclosure, in the case that the at least part of the region of the touch panel 10 includes the second region, in a width direction of any first electrode stripe 122 connected to the overlapping first electrode block 1212, a size of the overlapping first electrode block 1212 is greater than a size of the any first electrode stripe 122 to achieve that the area of the first orthographic projection is less than the area of the second orthographic projection. The size of the first electrode stripe 122 in the width direction of the first electrode stripe 122 is the same as the size of the second electrode stripe 142 in the width direction of the second electrode stripe 142, such that the orthographic projection of the overlapping first electrode block 1212 on the base substrate covers the second electrode stripe 142 in the second region.

In some embodiments, in the at least part of the region of the touch panel 10, a minimum edge distance between the first orthographic projection and the second orthographic projection is greater than 1 micron and less than 2 microns on the premise that the area of the first orthographic projection is less than the area of the second orthographic projection. The first orthographic projection refers to an orthographic projection of each second electrode block 141 in the bridge electrode layer 14 on the base substrate 11, or an orthographic projection of the second electrode stripe 142 overlapped with each overlapping first electrode block 1212 on the base substrate 11. The second orthographic projection refers to an orthographic projection of each target first electrode block 1211 on the base substrate 11, or an orthographic projection of each overlapping first electrode block 1212 on the base substrate 11.

Figure 6:
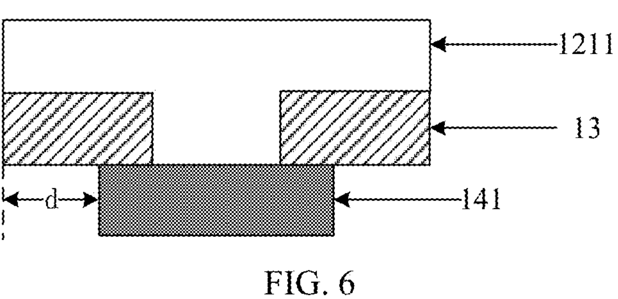
FIG. 6 is a section diagram of a first region in a touch panel according to some embodiments of the present disclosure.

FIG. 5 is a schematic section diagram of part of a first region in a touch panel according to some embodiments of the present disclosure (FIG. 5 does not show the structure of the insulation layer 13 in the part of region). FIG. 6 is a section diagram of the structure shown in FIG. 5 at a BB' direction. The at least part of the region of the touch panel 10 in the above embodiments includes the first region. Referring to FIG. 5 and FIG. 6, the minimum edge distance d between the first orthographic projection and the second orthographic projection is 1.4 microns.

(2) An overlapping region between the orthographic projection region of the at least one second electrode stripe 142 on the base substrate 11 and an orthographic projection region of the touch electrode layer 12 on the base substrate 11 is a polygon of which vertex angles all are obtuse angles.

In the embodiments of the present disclosure, the vertex angles of the overlapping region are designed as obtuse angles because the stress in the overlapping region (the second region described above) is concentrated and the obtuse angle reduces the stress concentration relative to the acute angle. For example, referring to FIG. 7, the vertex angles of the overlapping first electrode block 1212 in the overlapping region are processed to form a chamfering angle, such that the vertex angles are set as obtuse angles. It can be understood that due to process limitations, the obtuse angles may be prepared into rounded corners that are approximated to obtuse angles. Referring to FIG. 6, it can be seen that compared with the vertex angles of the overlapping first electrode block 1212 in the non-overlapping region, one vertex angle of the overlapping first electrode block 1212 in the overlapping region forms two obtuse angles after processing.

It can be understood that the smoothness (also referred to as flatness) of the edge region of the second electrode region 12*b* affects the stress concentration of the second electrode region 12*b*. The smoother the edge of the second electrode region 12*b*, the lower the stress concentration of the second electrode region 12*b*. Referring to FIG. 4, it can be seen that the region of the overlapping first electrode block 1212 in the above overlapping region is the edge region of the second electrode region 12*b*. Therefore, in the case that the vertex angles of the overlapping first electrode block 1212 in the overlapping region are processed as obtuse angles, the edge region of the second electrode region 12*b* is flat, such that the problem of the stress concentration of the second electrode region 12*b* is alleviated.

Figure 7:
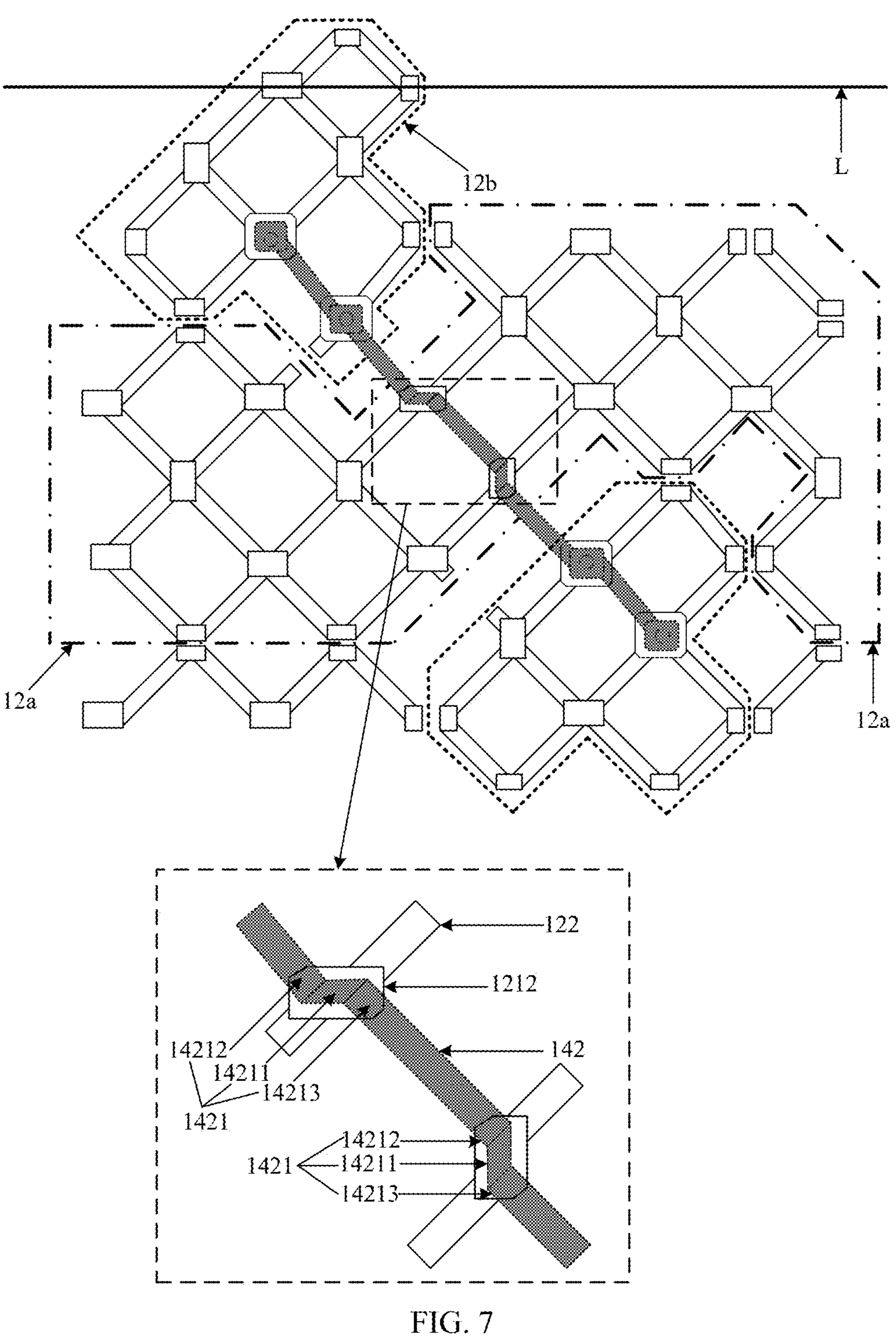
FIG. 7 is a schematic structural diagram of a touch electrode layer according to some embodiments of the present disclosure.

(3) The touch panel 10 includes a bendable region P1 having a capability of bending in a bending line L. Referring to FIG. 7, an overlapping electrode segment 1421 in a plurality of second electrode strips 142 includes a target electrode segment 14211 parallel to or perpendicular to the bending line L, and an orthographic projection of the overlapping electrode segment 1421 on the base substrate 11 is within an orthographic projection of the touch electrode layer 12 on the base substrate 11.

It can be understood that the region of the overlapping electrode segment 1421 is the second region described above. The orthographic projection of the overlapping electrode segment 1421 on the base substrate 11 is within an orthographic projection of the overlapping first electrode block 1212 in the touch electrode layer 12 on the base substrate 11. It can be seen based on the above description that the stress in the second region is concentrated.

In the touch panel 10, the stress concentration in the second region is correlated with the position relation between the overlapping electrode segment 1421 and the bending line L in the second region. The overlapping electrode segment 1421 is perpendicular to, parallel to, or inclined to the bending line L. In the three position relations, the stress concentration degree of the second region is the smallest in the case that the overlapping electrode segment 1421 is parallel to the bending line L, and the stress concentration degree of the second region is the largest in the case that the overlapping electrode segment 1421 is inclined to the bending line L. On this basis, in the touch panel 10 according to the present disclosure, the stress concentration in the second region is effectively alleviated by enabling the overlapping electrode segment 1421 to include the target electrode segment 14211 parallel to or perpendicular to the bending line L.

It can be understood that in the touch panel 10, the direction of the maximum length of the overlapping first electrode block 1212 in the plurality of first electrode blocks 121 has a position relation with the direction of the bending line L. For example, the direction of the maximum length of the overlapping first electrode block 1212 is parallel or perpendicular to the bending line L. Therefore, in the case that the scheme (3) is met, and the direction of the maximum length of the overlapping first electrode block 1212 is parallel or perpendicular to the bending line L, the target electrode segment 14211 in the overlapping electrode segment 1421 is parallel to the direction of the maximum length of the overlapping first electrode block 1212.

In some embodiments, as shown in FIG. 7, the overlapping electrode segment 1421 further includes a first electrode segment 14212 and a second electrode segment 14213. The first electrode segment 14212, the target electrode segment 14211, and the second electrode segment 14213 are connected in sequence, and the first electrode segment 14212 is parallel to the second electrode segment 14213 and is not parallel to the target electrode segment 14211.

In the embodiments of the present disclosure, for the overlapping electrode segment 1421 in the second electrode segment 142, only part of the overlapping electrode segment 1421 (that is, the target electrode segment 14211) has a corresponding relation with the bending line L and the direction of the maximum length of the overlapping first electrode block 1212, and the position relation of other electrode segments (that is, the first electrode segment 14212 and the second electrode segment 14213) in the overlapping electrode segment 1421 than the target electrode segment 14211 is not correlated with the bending line L and the direction of the maximum length of the overlapping first electrode block 1212.

(4) The touch panel 10 includes a bendable region P1 having a capability of bending in a bending line L. The second electrode blocks 141 in the bridge electrode layer 14 include a plurality of second electrode blocks 141 arranged in sequence in a direction parallel to or perpendicular to the bending line L.

In the embodiments of the present disclosure, in the first region in the touch panel 10, the position relation of the second electrode block 141 and the bending line L affects the stress concentration of the first region. The stress concentration degree of the first region in the case that the plurality of second electrode blocks 141 in the bridge electrode layer 14 are arranged in the direction parallel to or perpendicular to the bending line L is smaller than the stress concentration degree of the first region in the case that the plurality of second electrode blocks 141 are arranged in the direction inclined to the bending line L.

Figure 8:
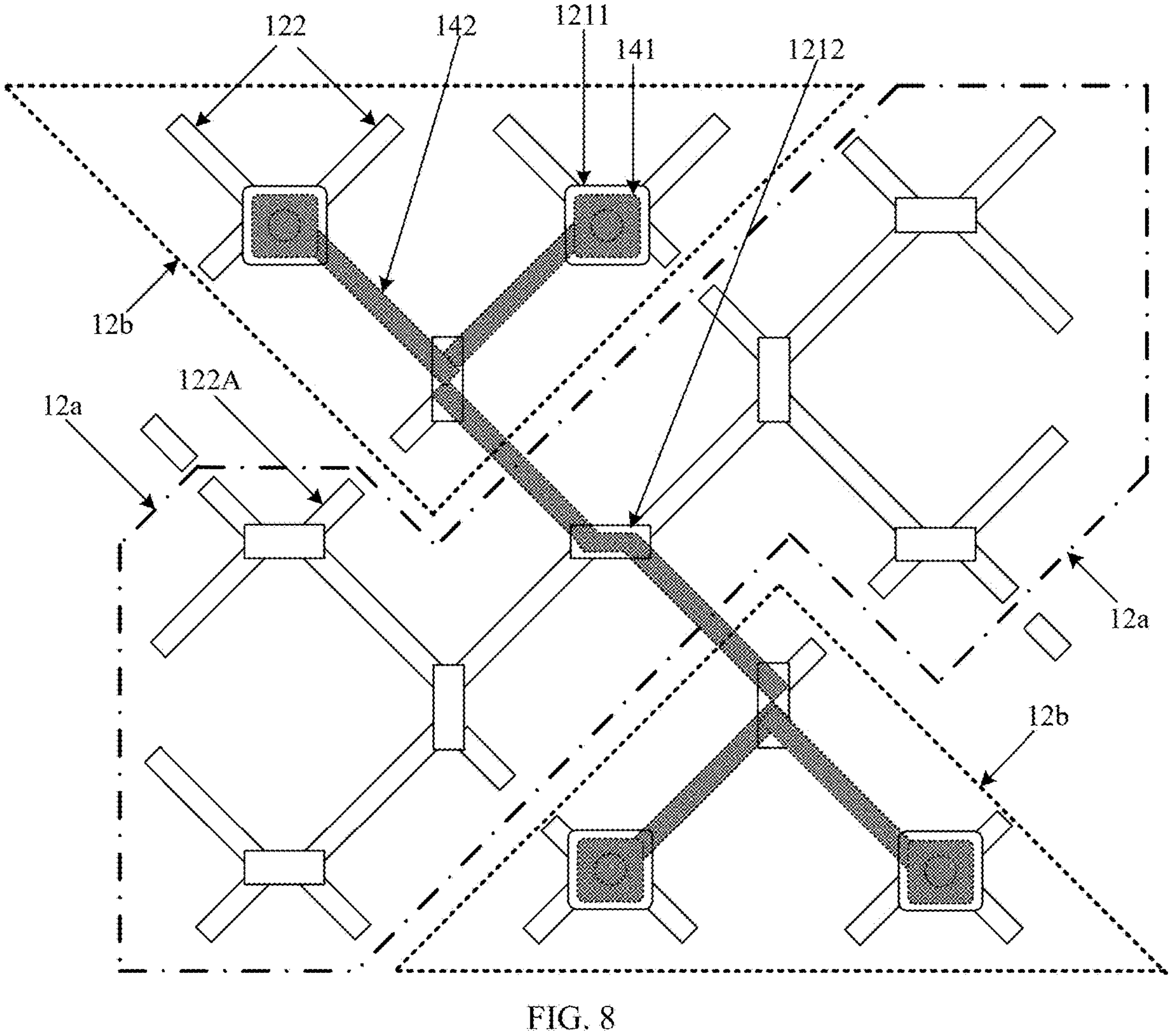
FIG. 8 is a schematic structural diagram of a touch electrode layer according to some embodiments of the present disclosure.

For example, referring to FIG. 8, each second electrode region **12*b* corresponds to two second electrode blocks 141, and the two second electrode blocks 141** are arranged in sequence in the direction parallel to the bending line L.

In addition, for the touch electrode layer 12 shown in FIG. 8, the first electrode region **12*a* and the second electrode region 12*b* are formed by cutting the positions of the strips in the net structure. Alternatively, the first electrode region 12*a* and the second electrode region 12*b*** are formed by cutting the positions of the blocks in the net structure, which is not limited in the present disclosure.

(5) In the first electrode region **12*a* and the two second electrode regions 12*b*, at least part of the first electrode blocks 121 in one electrode region close to another electrode region is not connected to the first electrode strips 122** at a side of the one electrode region facing toward the another electrode region.

In the embodiments of the present disclosure, in the case that the net structure composed of the strips and blocks is acquired, and the net structure is divided into the first electrode regions **12*a* and the second electrode regions 12*b***, cutting is performed at the positions of the blocks in the net structure or the positions of the strips in the net structure.

In a first implementation, cutting is performed at the positions of the blocks in the net structure. However, referring to FIG. 4, for a region (a part of a region Z shown in FIG. 4) of at least part of first electrode blocks 121 in boundary regions of the first electrode region **12*a* and the second electrode region 12*b*, the first electrode region 12*a* and the second electrode region 12*b* are formed by cutting the positions of the strips in the net structure. In the part of the region Z, the first electrode region 12*a* and the second electrode region 12*b* formed by cutting include the protruded first electrode stripe 122A (only one end of the first electrode stripe 122 is connected to the first electrode block 121, which is also referred to as a break line). Based on the mechanical principle, it can be seen that the break line is protruded, and thus the stress at the break line is concentrated. Therefore, the break line at the part of the region Z is removed to further reduce the stress concentration of the part of the region Z in the touch panel 10. Accordingly, referring to FIG. 9, after removal of the break line at the part of the region Z, the first electrode block 121 in the part of the region Z is not connected to the first electrode strip 122 at the side of the electrode region facing toward the another electrode region. That is, there is no protruded first electrode strip 122A. That is, for the touch electrode layer 12 after the break line is removed, two ends of any first electrode strip 122 in the first electrode region 12*a* and the second electrode region 12*b* are connected to the first electrode block 121**.

It can be seen that for any of the first electrode region **12*a* and the second electrode region 12*b***, the smooth of the edge (also referred to as flatness) affects the stress concentration of the electrode region. The smoother the edge of the electrode region, the lower the stress concentration of the electrode region. Thus, in the case that the protrusion or the sharp portion (for example, the above break line) at the edge of the electrode region is reduced, the edge of the electrode region is flatter, such that the concentrated stress in the electrode region is alleviated.

In addition, for any of the first electrode region **12*a* and the second electrode region 12*b***, the break line at the edge of the electrode region and other portions than the break line in the electrode region are in series. In the case that the break line at the edge of the electrode region is reduced, the resistance at the electrode region is reduced.

It should be understood that for alleviation of the stress concentration of the touch panel 20 by removing the break line, only the break line at partial electrode region in the first electrode region 12*a* and the second electrode region 12*b* is removed. For example, only the break line connected to at least part of the first electrode blocks 121 in the first electrode region 12*a* close to the second electrode region 12*b* is removed. Alternatively, only the break line connected to at least part of the first electrode blocks 121 in the second electrode region 12*b* close to the first electrode region 12*a* is removed. Alternatively, the break lines in the first electrode region 12*a* and the second electrode region 12*b* in the touch electrode layer 1 are removed, and in this case, two ends of any first electrode strip 122 in any of the first electrode region 12*a* and the second electrode region 12*b* are connected to the first electrode block 121.

In a second implementation, cutting is performed at the positions of the strips in the net structure in the case that the net structure composed of the strips and blocks is acquired, and the net structure is divided into the first electrode regions 12*a* and the second electrode regions 12*b*, such that the touch panel 10 shown in FIG. 7 is acquired. For the touch panel 10 shown in FIG. 7, the first electrode blocks 121 in one of the first electrode region 12*a* and the second electrode region 12*b* close to another of the first electrode region 12*a* and the second electrode region 12*b* are connected to the break line, that is, include the protruded first electrode stripe 122A.

For at least part of first electrode blocks 121 connected to the break lines in the electrode region, the break lines connected to the at least part of first electrode blocks 121 are removed. The at least part of first electrode blocks 121 are determined based on the touch performance of the touch panel 10 or randomly selected, which is not limited in the embodiments of the present disclosure.

Figure 10:
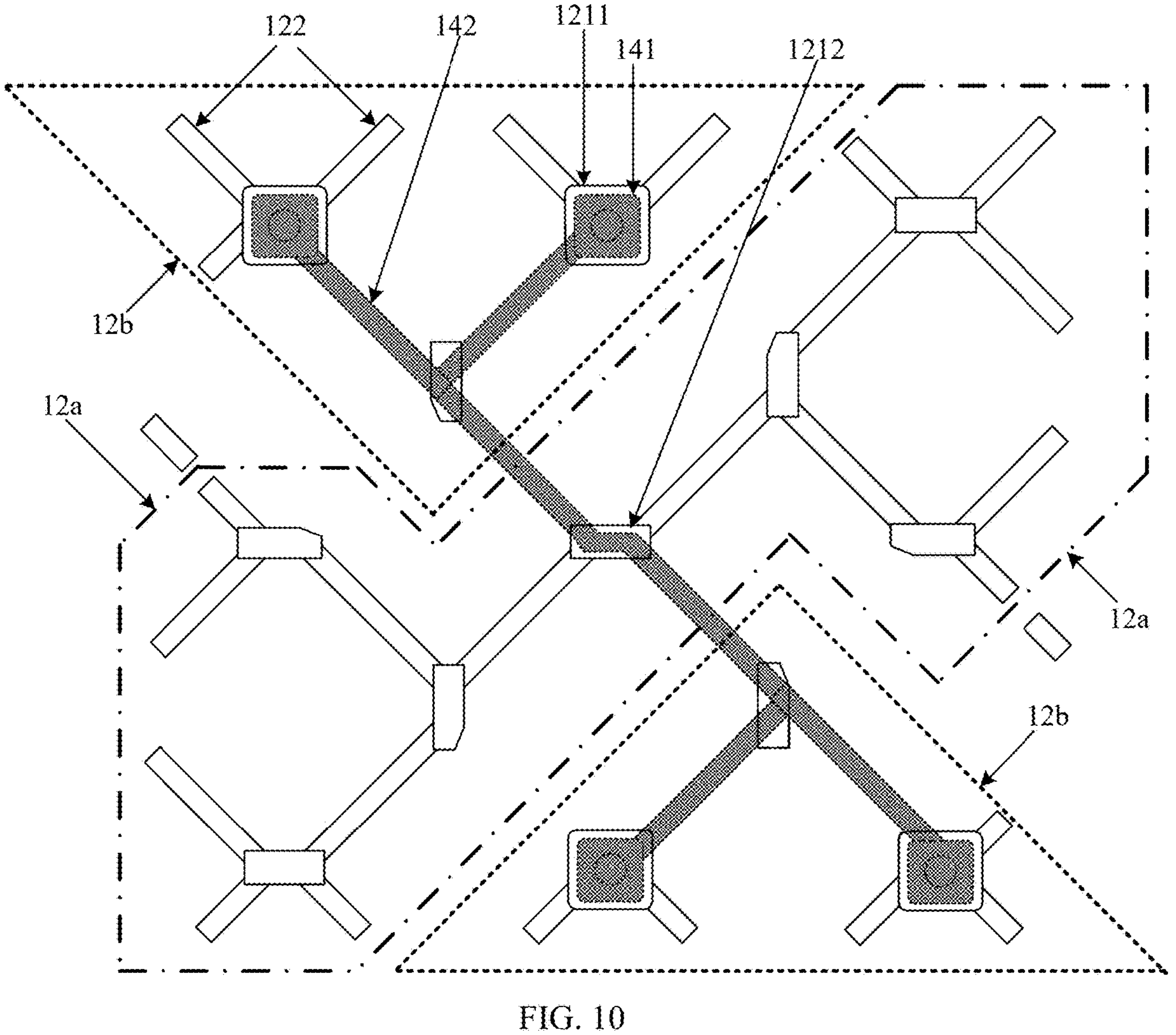
FIG. 10 is a schematic structural diagram of a touch electrode layer according to some embodiments of the present disclosure.

Illustratively, for the touch panel 10 shown in FIG. 8, the touch panel 10 shown in FIG. 10 is acquired by removing the break lines connected to the at least part of first electrode blocks 121.

In the process of manufacturing various film layers in the touch panel 10, after the bridge electrode layer 14 and the insulation layer 13 are manufactured on the base substrate 11, the metal layer is first formed on the side of the insulation layer 13 away from the base substrate. Then, the metal layer is processed by lithography to acquire the touch electrode layer 12 having the net structure 12. During the etching process, the metal layer in the region originally intended to form the break lines connected to at least part of first electrode blocks 121 is directly etched, and thus sides of at least part of first electrode blocks 121 in the touch electrode layer 12 facing toward another electrode region are not connected to the first electrode strip 122.

It should be noted that in some embodiments, after the net structure composed of the strips and blocks is acquired, and cutting is performed at the positions of the strips in the net structure to form the first electrode regions 12*a* and the second electrode regions 12*b*, the break lines at the edge of the first electrode regions 12*a* and the second electrode regions 12*b* are not removed. Accordingly, in the first electrode region 12*a* and the two second electrode regions 12*b*, at least part of the first electrode strips 122 (the above first electrode stripes 122A) in one electrode region close to another electrode region is not connected to the first electrode blocks 121 at an end of the one electrode region facing toward the another electrode region.

(6) An outer edge of at least one of the first electrode region 12*a* or the second electrode region 12*b* is a polygon of which vertex angles all are obtuse angles.

It can be understood that for at least one of the first electrode region 12*a* and the second electrode region 12*b*, the rounder the outer edge, the smaller the stress concentration at the outer edge of the electrode region. On this basis, the vertex angles of the outer edges of at least one electrode region are obtuse angles to alleviate the stress concentration. Due to process limitations, the vertex angles of the outer edges of at least one electrode region are rounded angles that are approximate to obtuse angle after processing.

In some embodiments, the vertex angles of the outer edges of at least one electrode region are processed to form a chamfering angle, such that the vertex angles of the outer edges of at least one electrode region are set as obtuse angles. In the process of processing the vertex angles of the first region at the outer edge of the second electrode region 12*b* and at the touch panel 10 (that is, the vertex angles of the target first electrode blocks 1211), an area of the orthographic projection of the target first electrode block 1211 on the base substrate 11 is greater than an area of an orthographic projection of the second electrode block 141 connected to the first target electrode 1211 on the base substrate 11 to avoid failure of the first target electrode block 1211 to support the covered insulation layer 13 during bending the touch panel 10.

Based on the relation of the orthographic projections of the first electrode block 1211 and the second electrode block 141 on the base substrate 11 in the scheme (1), a minimum edge distance between the first orthographic projection of the second electrode block 141 on the base substrate 11 and the second orthographic projection of the first electrode block 1211 on the base substrate 11 is greater than 1 micron and less than 2 microns. Thus, in the case that the vertex angle of the target first electrode block 1211 is processed to form a chamfer, a distance of the chamfer is determined based on the minimum edge distance. For example, in the case that the minimum edge distance is 2 microns, the distance of the chamfer is not be greater than 2 microns, for example, 1.4 microns.

Figure 9:
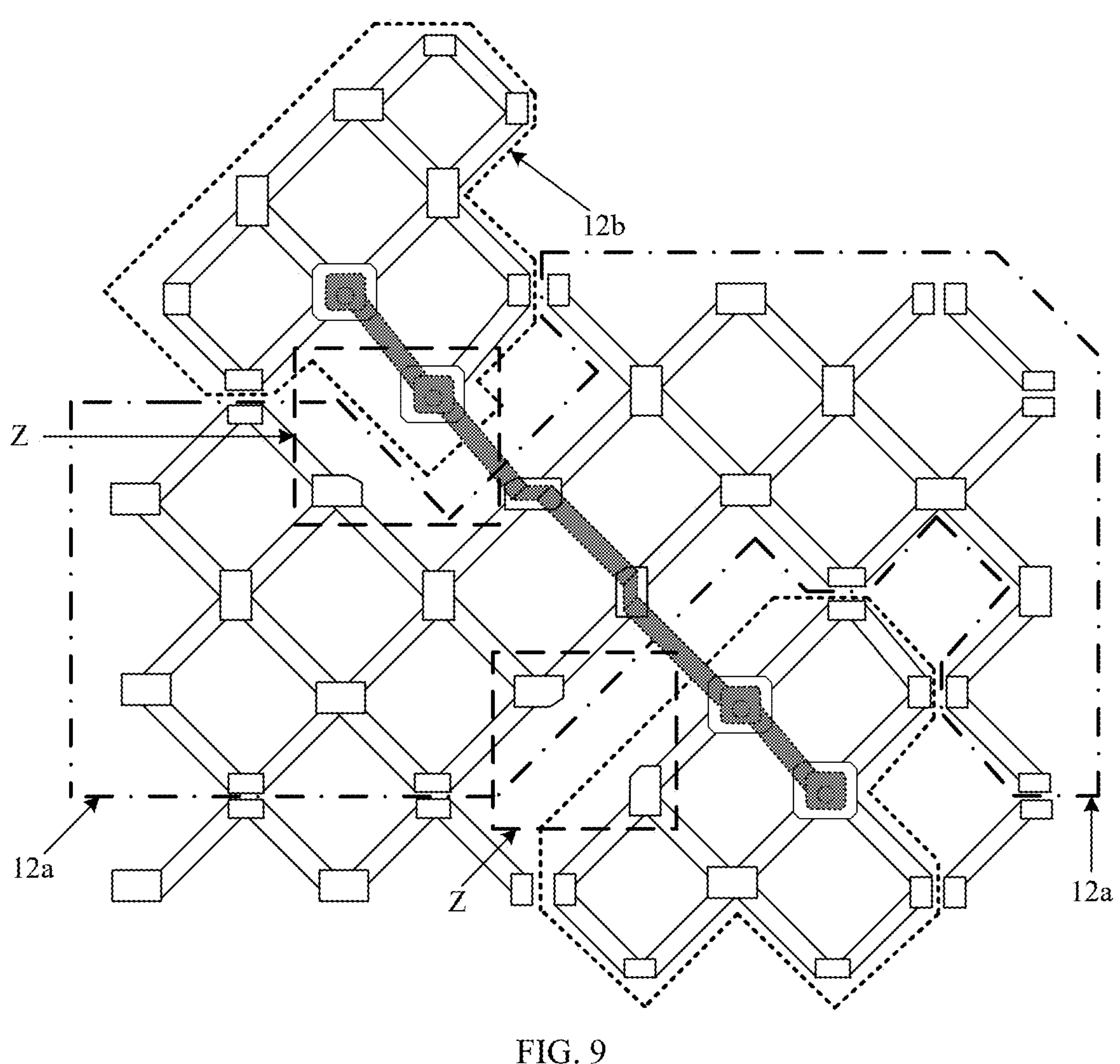
FIG. 9 is a schematic structural diagram of a touch electrode layer according to some embodiments of the present disclosure.

Illustratively, referring to FIG. 9, the first electrode block 121 in the touch electrode layer 12 is approximated as a quadrilateral (for example, a rectangle), and the first electrode strip 122 is electrically connected to the first electrode block 121 by connecting the vertex angle of the first electrode block 121. Accordingly, the vertex angle of the outer edge of at least one of the first electrode region 12*a* and the second electrode region 12*b* refers to the vertex angle of the first electrode block 121 on the outer edge that is not connected to the first electrode strip 122 (that is, the vertex angle where the break line is removed in the part of the region Z in FIG. 9).

It can be understood that the first electrode region 12*a* and the second electrode region 12*b* are formed by cutting the position of the stripe in the net structure as shown in FIG. 8 may also be processed by at least one of the above five schemes to acquire the touch panel 10 shown in FIG. 10.

In summary, the touch panel according to the embodiments of the present disclosure includes a base substrate, and a touch electrode layer, an insulation layer, and a bridge electrode layer that are arranged on the base substrate in sequence. The touch electrode layer includes a first electrode region, and two second electrode regions on two sides of the first electrode region and spaced apart from the first electrode region, wherein the two second electrode regions are electrically connected to each other through a via in the insulation layer and through the bridge electrode layer. An orthographic projection of the bridge electrode layer on the base substrate is within an orthographic projection of the touch electrode layer on the base substrate. An area of the first orthographic projection is less than an area of the second orthographic projection. As the relation of the projections of the touch electrode layer and the bridge electrode layer on the base substrate in the touch panel according to the embodiments of the present disclosure is different from the relation of the projections of the touch electrode layer and the bridge electrode layer on the base substrate in some practices, the implementations of the structure of the touch panel is diversified.

It should be noted that the term "at least one" in the present disclosure refers to one or more, and the term "a plurality of" refers to two or more.

The terms "first" and "second" in the present disclosure are not intended to distinguish same or similar items that have the same roles and functions. It should be understood that the terms "first," "second," and "n-th" do not have logic or timing relations, and are not intended to limit numbers and performing sequences.

Described above are merely illustrative embodiments of the present disclosure, and are not intended to limit the present disclosure. Any modifications, equivalent replacements, improvements and the like made within the spirit and principles of the present disclosure should be encompassed within the scope of protection of the present disclosure.

What is claimed is:

1. A touch panel, comprising: a base substrate, and a bridge electrode layer, an insulation layer, and a touch electrode layer layer that are arranged on the base substrate in sequence; wherein the touch electrode layer comprises a first electrode region, and two second electrode regions on two sides of the first electrode region and spaced apart from the first electrode region, wherein the two second electrode regions are electrically connected to each other through a via in the insulation layer and through the bridge electrode layer; and in at least part of a region of the touch panel, a first orthographic projection of the bridge electrode layer on the base substrate is within a second orthographic projection of the touch electrode layer on the base substrate, wherein an area of the first orthographic projection is less than an area of the second orthographic projection, the touch electrode layer comprises a plurality of first electrode blocks and a plurality of first electrode strips, wherein the plurality of first electrode blocks and the plurality of first electrode strips are both connected in a net structure in the first electrode region and the two second electrode regions; and the bridge electrode layer comprises at least one second electrode block corresponding to each of the two second electrode regions and at least one second electrode stripe, wherein the at least one second electrode block is connected to the at least one second electrode stripe; and for one of the two second electrode regions, at least one second electrode block corresponding to the one of the two second electrode regions is connected to at least one target first electrode block in the first electrode blocks in the one of the two second electrode regions in one-to-one correspondence through the via in the insulation layer.

2. The touch panel according to claim 1, comprising: a bendable region having a capability of bending toward a side of the bridge electrode layer away from the insulation layer, wherein the at least part of the region of the touch panel comprises at least part of the bendable region.

3. The touch panel according to claim 2, wherein in at least part of other regions in the touch panel than the bendable region, a third orthographic projection of the touch electrode layer on the base substrate is within a fourth orthographic projection of the bridge electrode layer on the base substrate.

4. The touch panel according to claim 1, wherein the plurality of first electrode blocks comprise an overlapping first electrode block, wherein an orthographic projection region of the overlapping first electrode block on the base substrate is overlapped with an orthographic projection region of the at least one second electrode stripe on the base substrate, and the overlapping first electrode block is different from the at least one target first electrode block; and the at least part of the region of the touch panel comprises at least one type of a region of the at least one target first electrode block or a region of the overlapping first electrode block.

5. The touch panel according to claim 1, wherein in a width direction of any of the plurality of first electrode strips connected to the overlapping first electrode block, a size of the overlapping first electrode block is greater than a size of the any of the plurality of first electrode strips.

6. The touch panel according to claim 1, wherein an overlapping region between the orthographic projection region of the at least one second electrode stripe on the base substrate and an orthographic projection region of the touch electrode layer on the base substrate is a polygon of which vertex angles all are obtuse angles.

7. The touch panel according to claim 1, further comprising: a bendable region having a capability of bending in a bending line, wherein an overlapping electrode segment in the at least one second electrode stripe comprises a target electrode segment parallel to or perpendicular to the bending line, and an orthographic projection of the overlapping electrode segment on the base substrate is within an orthographic projection of the touch electrode layer on the base substrate.

8. The touch panel according to claim 7, wherein the orthographic projection of the overlapping electrode segment on the base substrate is within an orthographic projection of an overlapping first electrode block in the plurality of first electrode blocks on the base substrate, a direction of a maximum length of the overlapping first electrode block is parallel to or perpendicular to the bending line, and the target electrode segment is parallel to the direction of the maximum length of the overlapping first electrode block; and the overlapping electrode segment further comprises a first electrode segment and a second electrode segment, wherein the first electrode segment, the target electrode segment, and the second electrode segment are connected in sequence, and the first electrode segment is parallel to the second electrode segment and is not parallel to the target electrode segment.

9. The touch panel according to claim 1, comprising: a bendable region having a capability of bending in a bending line, wherein the at least one second electrode block in the bridge electrode layer comprises a plurality of second electrode blocks arranged in sequence in a direction parallel to or perpendicular to the bending line.

10. The touch panel according to claim 1, wherein in the first electrode region and the two second electrode regions, at least part of the first electrode strips in one electrode region close to another electrode region is not connected to the first electrode blocks at an end of the one electrode region facing toward the another electrode region.

11. The touch panel according to claim 1, wherein in the first electrode region and the two second electrode regions, at least part of the first electrode blocks in one electrode region close to another electrode region is not connected to the first electrode strips at a side of the one electrode region facing toward the another electrode region.

12. The touch panel according to claim 11, wherein two ends of any of the first electrode strips are connected to the first electrode blocks.

13. The touch panel according to claim 1, wherein an outer edge of at least one of the first electrode region or the second electrode region is a polygon of which vertex angles all are obtuse angles.

14. The touch panel according to claim 1, wherein in the at least part of the region of the touch panel, a minimum edge distance between the first orthographic projection and the second orthographic projection is greater than 1 micron and less than 2 microns.

15. A touch panel, comprising: a base substrate, and a bridge electrode layer, an insulation layer, and a touch electrode layer that are arranged on the base substrate in sequence; wherein the touch electrode layer comprises a first electrode region, and two second electrode regions on two sides of the first electrode region and spaced apart from the first electrode region, wherein the two second electrode regions are electrically connected to each other through a via in the insulation layer and through the bridge electrode layer;

the touch electrode layer comprises a plurality of first electrode blocks and a plurality of first electrode strips, wherein the plurality of first electrode blocks and the plurality of first electrode strips are both connected in a net structure in the first electrode region and the two second electrode regions;

the bridge electrode layer comprises second electrode blocks corresponding to the two second electrode regions respectively and at least one second electrode stripe, wherein the second electrode blocks are connected to the at least one second electrode stripe; and for one of the two second electrode regions, at least one of the second electrode blocks corresponding to the one of the two second electrode regions is connected to at least one of the first electrode blocks in the one of the two second electrode regions in one-to-one correspondence through the via in the insulation layer; and the touch panel comprises a bendable region having a capability of bending in a bending line, wherein an overlapping electrode segment in the at least one second electrode stripe comprises a target electrode segment parallel to or perpendicular to the bending line, and an orthographic projection of the overlapping electrode segment on the base substrate is within an orthographic projection of the touch electrode layer on the base substrate.

16. The touch panel according to claim 15, wherein the orthographic projection of the overlapping electrode segment on the base substrate is within an orthographic projection of an overlapping first electrode block in the plurality of first electrode blocks on the base substrate, a direction of a maximum length of the overlapping first electrode block is parallel to or perpendicular to the bending line, and the target electrode segment is parallel to the direction of the maximum length of the overlapping first electrode block.

17. A touch panel, comprising: a base substrate, and a bridge electrode layer, an insulation layer, and a touch electrode layer that are arranged on the base substrate in sequence; wherein the touch electrode layer comprises a first electrode region, and two second electrode regions on two sides of the first electrode region and spaced apart from the first electrode region, wherein the two second electrode regions are electrically connected to each other through a via in the insulation layer and through the bridge electrode layer;

the touch electrode layer comprises a plurality of first electrode blocks and a plurality of first electrode strips, wherein the plurality of first electrode blocks and the plurality of first electrode strips are both connected in a net structure in the first electrode region and the two second electrode regions; and in the first electrode region and the two second electrode regions, at least part of the first electrode strips in one electrode region close to another electrode region is not connected to the first electrode blocks at a side of the one electrode region facing toward the another electrode region; and the bridge electrode layer comprises second electrode blocks corresponding to the two second electrode regions respectively and at least one second electrode stripe, wherein the second electrode blocks are connected to the at least one second electrode stripe; and for one of the two second electrode regions, at least one of the second electrode blocks corresponding to the one of the two second electrode regions is connected to at least one of the first electrode blocks in the one of the two second electrode regions in one-to-one correspondence through the via in the insulation layer.

18. A touch device, comprising: the touch panel as defined according to claim 1, and a touch chip, wherein the touch chip is configured to determine a touch position on the touch panel through a touch electrode layer in the touch panel.

19. The touch device according to claim 18, wherein the touch device has a bendable region.

* * * * *